US012310907B2

(12) United States Patent
Odashima et al.

(10) Patent No.: US 12,310,907 B2
(45) Date of Patent: May 27, 2025

(54) MOTION ASSISTANCE APPARATUS

(71) Applicant: TOYOTA JIDOSHA KABUSHIKI KAISHA, Toyota (JP)

(72) Inventors: Tadashi Odashima, Toyota (JP); Seiichi Tanabe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 736 days.

(21) Appl. No.: 17/701,894

(22) Filed: Mar. 23, 2022

(65) Prior Publication Data

US 2022/0313528 A1 Oct. 6, 2022

(30) Foreign Application Priority Data

Apr. 6, 2021 (JP) ................................. 2021-064643

(51) Int. Cl.
*A61H 3/00* (2006.01)
*A61H 1/02* (2006.01)

(52) U.S. Cl.
CPC ............... *A61H 1/024* (2013.01); *A61H 3/00* (2013.01); *A61H 2003/007* (2013.01);
(Continued)

(58) Field of Classification Search
CPC .... A61H 1/024; A61H 1/0244; A61H 1/0237; A61H 1/0255; A61H 1/0262; A61H 1/0266; A61H 3/00; A61H 2003/007; A61H 2003/005; A61H 2201/1215; A61H 2201/164; A61H 2201/165; A61H 2201/0157; A61H 2201/1436;
(Continued)

(56) References Cited

U.S. PATENT DOCUMENTS

| | | | | |
|---|---|---|---|---|
| 5,353,839 A * | 10/1994 | Kordonsky | ...... | A63B 21/00845 137/806 |
| 6,027,429 A * | 2/2000 | Daniels | ............ | A63B 21/00845 482/92 |

(Continued)

FOREIGN PATENT DOCUMENTS

| | | | |
|---|---|---|---|
| CN | 107440887 A * | 12/2017 | ............. A61B 5/369 |
| JP | H04-133833 U | 12/1992 | |

(Continued)

OTHER PUBLICATIONS

CN107440887A description translation (Year: 2017).*

*Primary Examiner* — Timothy A Stanis
*Assistant Examiner* — Kira B Daher
(74) *Attorney, Agent, or Firm* — Oliff PLC

(57) ABSTRACT

A motion assistance apparatus includes a first link, a second link coupled to the first link via a rotary shaft so as to rotate, a duct fixed to the first link, an electromagnet disposed so as to cover at least part of the duct, a first movable portion connected to a first end of the duct, a second movable portion connected to a second end of the duct, magnetic fluid filled in a hermetically sealed space defined by the duct, the first movable portion, and the second movable portion, a transmitting portion configured to convert relative rotation between the first link and the second link to a relative position change between the first movable portion and the second movable portion, and a control unit configured to control the electromagnet.

14 Claims, 8 Drawing Sheets

(52) U.S. Cl.
CPC ................ *A61H 2201/1215* (2013.01); *A61H 2201/164* (2013.01); *A61H 2201/165* (2013.01); *A61H 2205/102* (2013.01)

(58) Field of Classification Search
CPC .... A61H 2201/5051; A61H 2201/1207; A61H 2205/102; B25J 9/0006; A61F 5/0102; A61F 5/0123; A61F 5/0125; A61F 5/013; A61F 2005/0158–0167; A63B 21/005; A63B 21/0052; A63B 21/0056; A63B 21/00845
USPC ....................... 482/74–75, 93, 110, 111, 114
See application file for complete search history.

(56) References Cited

U.S. PATENT DOCUMENTS

| | | | |
|---|---|---|---|
| 2013/0012852 | A1 | 1/2013 | Imaida et al. |
| 2017/0198728 | A1 | 7/2017 | Noda et al. |
| 2018/0200136 | A1 | 7/2018 | Yamazaki |

FOREIGN PATENT DOCUMENTS

| | | | |
|---|---|---|---|
| JP | 2004-232709 | A | 8/2004 |
| JP | 2016-006345 | A | 1/2016 |
| JP | 2016-191467 | A | 11/2016 |
| JP | 2018-114175 | A | 7/2018 |
| WO | 2012/081107 | A1 | 6/2012 |

* cited by examiner

MOTION ASSISTANCE APPARATUS

CROSS-REFERENCE TO RELATED APPLICATION

This application claims priority to Japanese Patent Application No. 2021-064643 filed on Apr. 6, 2021, incorporated herein by reference in its entirety.

BACKGROUND

1. Technical Field

The disclosure relates to a motion assistance apparatus.

2. Description of Related Art

When, for example, a hemiplegic patient or the like does walking training, a motion assistance apparatus is worn on an affected leg to prevent knee buckling of an affected leg. Such a motion assistance apparatus, as described in Japanese Unexamined Patent Application Publication No. 2018-114175 (JP 2018-114175 A), includes an upper thigh link attached to the upper thigh of an affected leg of a user, a lower thigh link coupled to the upper thigh link via a knee joint part and attached to the lower thigh of the affected leg, a motor unit that drives the knee joint part, and the like. The motion assistance apparatus is configured to generate a resistance for preventing knee buckling of the affected leg of the user by using the driving force of the motor unit.

SUMMARY

The applicant found the following challenge. A general motion assistance apparatus is configured to generate a resistance for preventing knee buckling of an affected leg of a user by using a motor unit. For this reason, a mechanism for generating resistance against rotational motion of a joint of a user becomes complex, so it is difficult to achieve both high resistance and size reduction.

The disclosure achieves both simplification and size reduction of a motion assistance apparatus.

An aspect of the disclosure relates to a motion assistance apparatus. The motion assistance apparatus is configured to be worn on a joint of a user. The motion assistance apparatus includes a first link, a second link coupled to the first link via a rotary shaft so as to rotate, a duct fixed to the first link, an electromagnet disposed so as to cover at least part of the duct, a first movable portion connected to a first end of the duct so as to communicate with the duct and configured to contain magnetic fluid, a second movable portion connected to a second end of the duct so as to communicate with the duct and configured to contain the magnetic fluid, the magnetic fluid filled in a hermetically sealed space defined by the duct, the first movable portion, and the second movable portion, a transmitting portion configured to convert relative rotation between the first link and the second link to a relative position change between the first movable portion and the second movable portion, and a control unit configured to control the electromagnet.

In the motion assistance apparatus, the at least part of the duct, covered with the electromagnet, may be made of a magnetically permeable material.

In the motion assistance apparatus, the duct may include a crank part, and the electromagnet may be disposed so as to cover at least part of the crank part.

The motion assistance apparatus may further include a bypass passage connected in parallel with the duct, and a check valve provided in the bypass passage.

In the motion assistance apparatus, the transmitting portion may include a closed-end cylindrical first storage portion connected the first link so as to slide on the first link, a closed-end cylindrical second storage portion connected to the first link so as to slide on the first link, a pinion fixed to the rotary shaft, and a first rack meshing with the pinion and fixed to the first storage portion, in a state where the first movable portion is accommodated in the first storage portion, a distal end of the first movable portion may be connected to a bottom of the first storage portion, and, in a state where the second movable portion is accommodated in the second storage portion, a distal end of the second movable portion may be connected to a bottom of the second storage portion.

The motion assistance apparatus may further include a second rack meshing with the pinion and fixed to the second storage portion.

In the motion assistance apparatus, the transmitting portion may include a closed-end cylindrical first storage portion connected to the first link so as to slide on the first link, a closed-end cylindrical second storage portion connected to the first link so as to slide on the first link, an arm fixed to the second link, a first rod connecting a first end of the arm and the first storage portion, and a second rod connecting a second end of the arm and the second storage portion, in a state where the first movable portion is accommodated in the first storage portion, a distal end of the first movable portion may be connected to a bottom of the first storage portion, and, in a state where the second movable portion is accommodated in the second storage portion, a distal end of the second movable portion may be connected to a bottom of the second storage portion.

The motion assistance apparatus may further include a first lid portion fitted to an opening of the first storage portion so as to be displaceable relative to the first storage portion and disposed between the first end of the duct and the first movable portion, and a second lid portion fitted to an opening of the second storage portion so as to be displaceable relative to the second storage portion and disposed between the second end of the duct and the second movable portion, the first lid portion may include a through portion configured to communicate the duct with the first movable portion, and the second lid portion may include a through portion configured to communicate the duct with the second movable portion.

In the motion assistance apparatus, the first movable portion may be configured so as to extend and contract, and the second movable portion may be configured so as to extend and contract.

In the motion assistance apparatus, the first movable portion may include a bellows, and the second movable portion may include a bellows.

In the motion assistance apparatus, the first movable portion may be in a closed-end cylindrical shape, and the second movable portion may be in a closed-end cylindrical shape.

In the motion assistance apparatus, the first storage portion may be connected to the first link via a slider so as to slide on the first link, and the second storage portion may be connected to the first link via a slider so as to slide on the first link.

In the motion assistance apparatus, the control unit may be configured to control a voltage applied to the electromagnet.

In the motion assistance apparatus, the control unit may be configured to control start and stop of application of the voltage to the electromagnet.

According to the aspect of the disclosure, it is possible to achieve both simplification and size reduction of the motion assistance apparatus.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, example embodiments of the disclosure will be described in detail with reference to the accompanying drawings. However, the disclosure is not limited to the following embodiments. For clear illustration, the following description and drawings are simplified as needed.

First Embodiment

Figure 1:
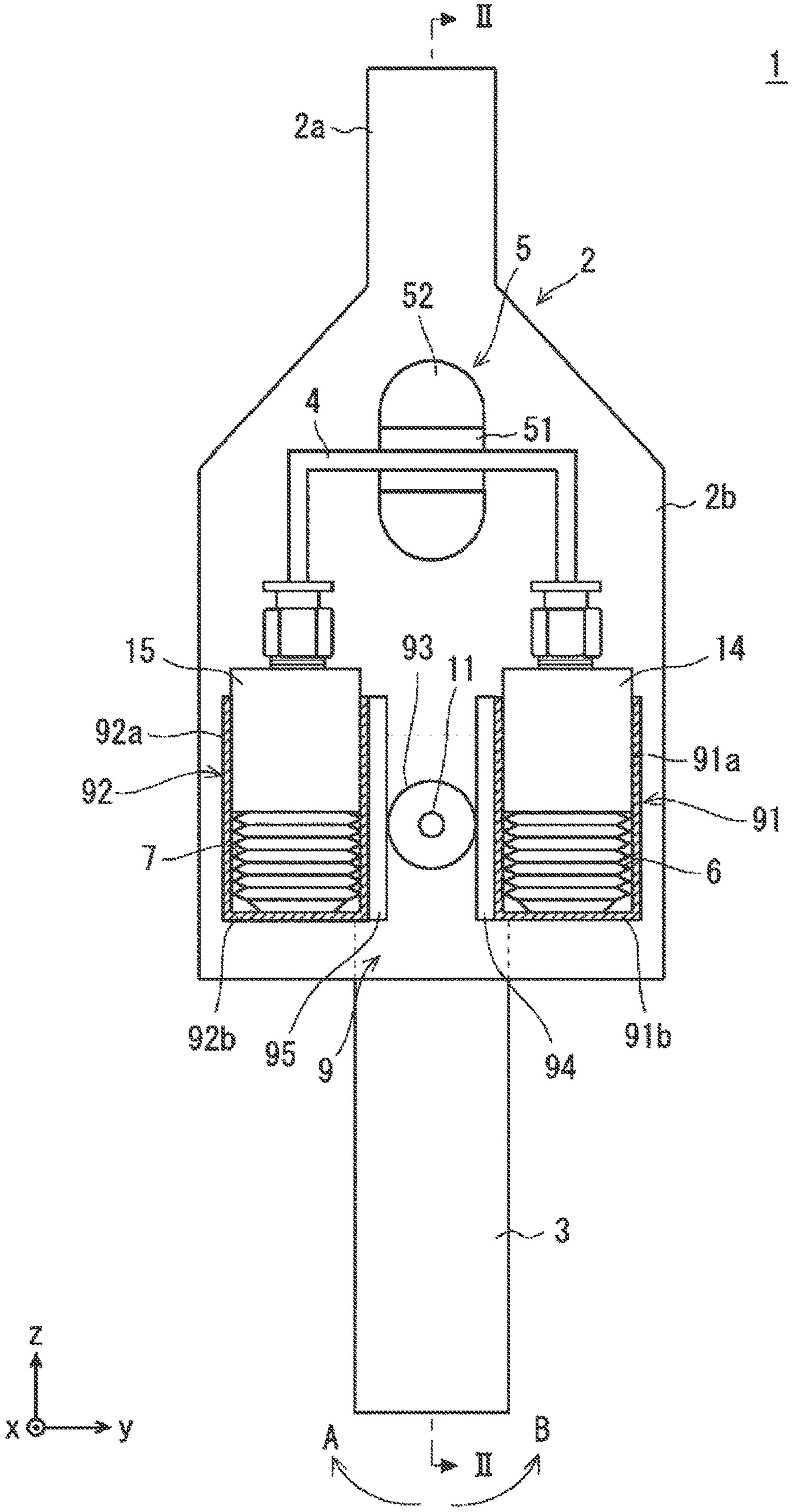
FIG. 1 is a view showing a motion assistance apparatus according to a first embodiment.
Figure 2:
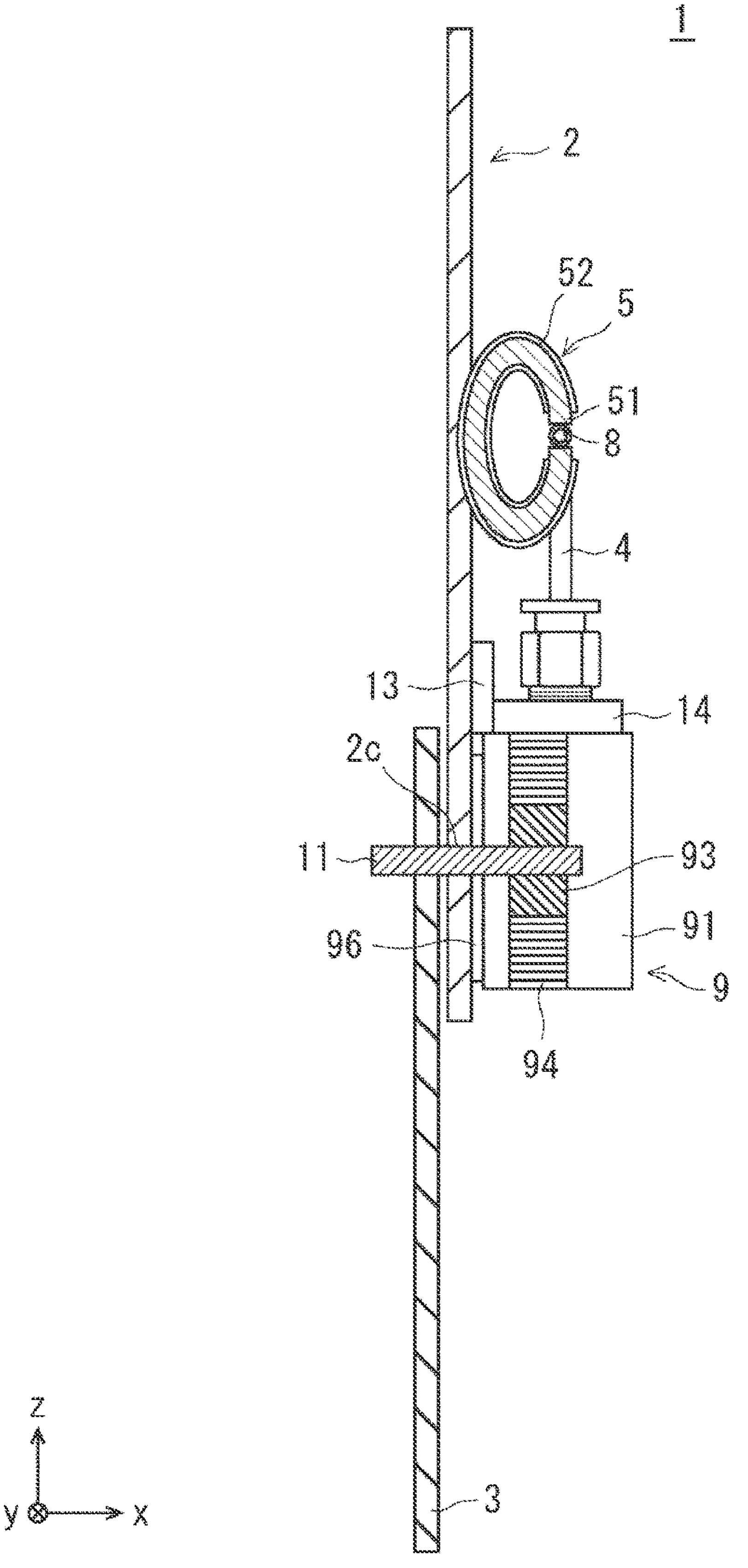
FIG. 2 is a sectional view taken along the line II-II in FIG. 1.
Figure 3:
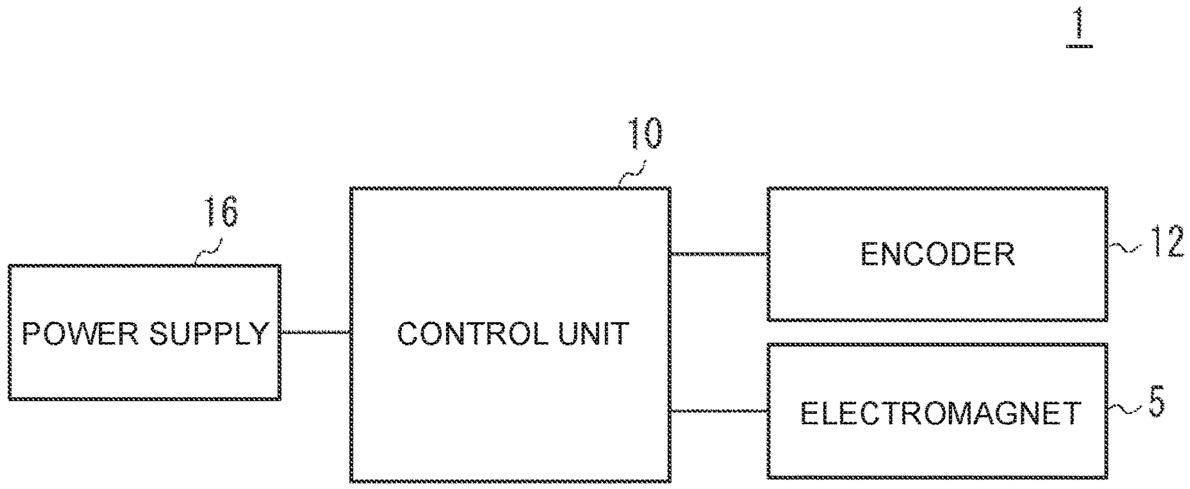
FIG. 3 is a block diagram showing a control system of the motion assistance apparatus according to the first embodiment.

Initially, the configuration of a motion assistance apparatus according to the present embodiment will be described. FIG. 1 is a view showing the motion assistance apparatus according to the present embodiment. FIG. 2 is a sectional view taken along the line II-II in FIG. 1. FIG. 3 is a block diagram showing a control system of the motion assistance apparatus according to the present embodiment.

In the following description, for clear illustration, the configuration of the motion assistance apparatus 1 in a state where a first link 2 and a second link 3 are disposed in a straight line as shown in FIG. 1 will be described by using an orthogonal coordinate system (XYZ coordinate system).

For example, as shown in FIG. 1 to FIG. 3, the motion assistance apparatus 1 includes the first link 2, the second link 3, a duct 4, an electromagnet 5, a first movable portion 6, a second movable portion 7, magnetic fluid 8, a transmitting portion 9, and a control unit 10. The first link 2 has, for example, a plate shape substantially parallel to a YZ-plane. The first link 2 includes a first part 2*a* and a second part 2*b*.

The first part 2*a* has, for example, a substantially rectangular shape with a long side in a Z-axis direction when viewed in an X-axis direction. The second part 2*b* is disposed on the negative Z-axis side with respect to the first part 2*a*. The width of the second part 2*b* in a Y-axis direction is greater than the width of the first part 2*a* in the Y-axis direction. The second part 2*b* has, for example, a substantially rectangular shape as a basic form when viewed in the X-axis direction, and both corners of the second part 2*b* on the positive Z-axis side are cut out.

As shown in FIG. 1 and FIG. 2, the second link 3 is disposed on the negative X-axis side with respect to the first link 2. The second link 3 has, for example, a plate shape substantially parallel to the YZ-plane and has a substantially rectangular shape with a long side in the Z-axis direction when viewed in the X-axis direction. A positive Z-axis-side end of the second link 3 is relatively rotatably coupled to a negative Z-axis-side end of the first link 2 via a rotary shaft 11.

As shown in FIG. 2, the rotary shaft 11 protrudes from the positive Z-axis-side end of the second link 3 toward a positive X-axis side. The rotary shaft 11 is inserted in a through portion 2*c* formed in the negative Z-axis-side end of the first link 2.

Thus, the first link 2 and the second link 3 are configured to be relatively rotatable. An encoder 12 (see FIG. 3) is provided on the first link 2 so as to be capable of detecting the rotation angle of the rotary shaft 11 with respect to the first link 2. The rotation angle of the second link 3 with respect to the first link 2 is able to be detected by the encoder.

For example, as shown in FIG. 1, the duct 4 has a substantially inverted U-shape when viewed in the X-axis direction. For example, as shown in FIG. 2, both ends of the duct 4 are fixed to a positive X-axis-side surface of the second part 2*b* of the first link 2 via a fixture jig 13.

Here, in the duct 4, as will be described later, a part covered with the electromagnet 5 can be made of a magnetically permeable material, such as a metal, and the other part may be made of any material and may be made of a metal, a resin, or the like.

As shown in FIG. 1 and FIG. 2, the electromagnet 5 is fixed to the positive X-axis-side surface of the second part 2*b* of the first link 2 so as to cover at least part of the duct 4. The electromagnet 5 includes an iron core 51 and a coil 52.

For example, as shown in FIG. 2, the iron core 51 has a substantially C-shape when viewed in the Y-axis direction. The iron core 51 extends in the Y-axis direction in a state where the duct 4 is sandwiched by a positive X-axis-side opening of the iron core 51. The coil 52 is disposed so as to surround the iron core 51.

The configuration and arrangement of the electromagnet 5 are not limited as long as the electromagnet 5 is capable of applying a magnetic field to the magnetic fluid 8 flowing though the duct 4 as will be described later. In FIG. 1 or the like, the coil 52 is shown in a simplified view.

As shown in FIG. 1, the first movable portion 6 is connected to a positive Y-axis-side end of the duct 4 so as to communicate with the duct 4. The first movable portion 6 is made up of, for example, a resin bellows. The first movable portion 6 has a storage portion containing the magnetic fluid 8 inside.

In other words, the first movable portion 6 is in a closed-end cylindrical shape and is capable of extending and contracting. The first movable portion 6 is disposed so as to be capable of extending and contracting in the Z-axis direction. A positive Z-axis-side opening end of the first movable portion 6 is connected to the positive Y-axis-side end of the duct 4.

As shown in FIG. 1, the second movable portion 7 is connected to a negative Y-axis-side end of the duct 4 so as to communicate with the duct 4. The second movable portion 7 is made up of, for example, a resin bellows. The second movable portion 7 has a storage portion containing the magnetic fluid 8 inside.

In other words, the second movable portion 7 is also in a closed-end cylindrical shape and is capable of extending and contracting. The second movable portion 7 is disposed so as to be capable of extending and contracting in the Z-axis direction. A positive Z-axis-side opening end of the second movable portion 7 is connected to a negative Y-axis-side end of the duct 4.

Thus, a substantially hermetically sealed space is defined by the duct 4, the first movable portion 6, and the second movable portion 7. Each of the first movable portion 6 and the second movable portion 7 just needs to be configured such that the volume inside the first movable portion 6 and the volume inside the second movable portion 7 relatively change as a result of deformation or displacement in the Z-axis direction, and may be made up of, for example, a bag body or the like.

The magnetic fluid 8 is liquid obtained by dispersing magnetic particles in a solvent as in the case of a general magnetorheological (MR) fluid. The magnetic fluid 8 is filled in the substantially hermetically sealed space defined by the duct 4, the first movable portion 6, and the second movable portion 7.

The transmitting portion 9 converts relative rotation between the first link 2 and the second link 3 to a relative position change in the Z-axis direction between the first movable portion 6 and the second movable portion 7. For example, as shown in FIG. 1, the transmitting portion 9 includes a first storage portion 91, a second storage portion 92, a pinion 93, a first rack 94, and a second rack 95. In FIG. 1, the pinion 93, the first rack 94, and the second rack 95 are shown in a simplified view.

The first storage portion 91 is disposed on the positive Y-axis side with respect to the rotary shaft 11. The first storage portion 91 is in a closed-end cylindrical shape and has an opening at a positive Z-axis-side end of the first storage portion 91. In other words, the first storage portion 91 includes a cylindrical portion 91*a* extending through in the Z-axis direction, and a bottom 91*b* closing a negative Z-axis-side end of the cylindrical portion 91*a*.

As shown in FIG. 2, the first storage portion 91 is connected to the positive X-axis-side surface of the second part 2*b* of the first link 2 via a slider 96 so as to be slidable in the Z-axis direction. The first movable portion 6 is accommodated in the first storage portion 91, and a negative Z-axis-side end of the first movable portion 6 is connected to the bottom 91*b* of the first storage portion 91.

At this time, although detailed functions will be described later, the first lid portion 14 disposed between the positive Y-axis-side end of the duct 4 and the first movable portion 6 can be inserted in the first storage portion 91. More specifically, the first lid portion 14 has a columnar shape with a circumferential shape substantially the same as the inner shape of the cylindrical portion 91*a* of the first storage portion 91 as a basic form, and includes a through portion extending through the first lid portion 14 in the Z-axis direction.

In a state where a positive Y-axis-side end of the duct 4 is connected to a positive Z-axis-side end of the first lid portion 14 and the positive Z-axis-side opening end of the first movable portion 6 is connected to a negative Z-axis-side end of the first lid portion 14, the first lid portion 14 is inserted in the cylindrical portion 91*a* of the first storage portion 91. At this time, the first lid portion 14 is fixed to the second part 2*b* of the first link 2 via the fixture jig 13.

Thus, while the first lid portion 14 closes the opening of the first storage portion 91 to form a substantially hermetically sealed space, the first lid portion 14 and the first storage portion 91 are fitted to each other such that the first storage portion 91 is slidable with respect to the first lid portion 14. The duct 4 and the first movable portion 6 communicate with each other via the first lid portion 14.

The second storage portion 92 is disposed on the negative Y-axis side with respect to the rotary shaft 11. The second storage portion 92 is in a closed-end cylindrical shape and has an opening at a positive Z-axis-side end of the second storage portion 92. In other words, the second storage portion 92 includes a cylindrical portion 92*a* extending through in the Z-axis direction, and a bottom 92*b* closing a negative Z-axis-side end of the cylindrical portion 92*a*.

The second storage portion 92 is connected to the positive X-axis-side surface of the second part 2*b* of the first link 2 via a slider (not shown) so as to be slidable in the Z-axis direction. As shown in FIG. 1, the second movable portion 7 is accommodated in the second storage portion 92, and a negative Z-axis-side end of the second movable portion 7 is connected to the bottom 92*b* of the second storage portion 92.

At this time, although detailed functions will be described later, the second lid portion 15 disposed between the negative Y-axis-side end of the duct 4 and the second movable portion 7 can be inserted in the second storage portion 92. More specifically, the second lid portion 15 has a columnar shape with a circumferential shape substantially the same as the inner shape of the cylindrical portion 92*a* of the second storage portion 92 as a basic form, and includes a through portion extending through the second lid portion 15 in the Z-axis direction.

In a state where a negative Y-axis-side end of the duct 4 is connected to a positive Z-axis-side end of the second lid portion 15 and the positive Z-axis-side opening end of the second movable portion 7 is connected to a negative Z-axis-side end of the second lid portion 15, the second lid portion 15 is inserted in the cylindrical portion 92*a* of the second storage portion 92. At this time, the second lid portion 15 is fixed to the second part 2*b* of the first link 2 via the fixture jig 13.

Thus, while the second lid portion 15 closes the opening of the second storage portion 92 to form a substantially hermetically sealed space, the second lid portion 15 and the second storage portion 92 are fitted to each other such that the second storage portion 92 is slidable with respect to the second lid portion 15. The duct 4 and the second movable portion 7 communicate with each other via the second lid portion 15.

As shown in FIG. 1 and FIG. 2, the pinion 93 is fixed to the rotary shaft 11. The first rack 94 is fixed to the cylindrical portion 91*a* of the first storage portion 91 and extends in the Z-axis direction. The first rack 94 is in mesh with the pinion 93. The second rack 95 is fixed to the cylindrical portion 92*a* of the second storage portion 92 and extends in the Z-axis direction. The second rack 95 is in mesh with the pinion 93.

The transmitting portion 9 just needs to be disposed such that, when a user extends or bends the affected leg, the elements are able to move without interference.

The control unit 10 controls the electromagnet 5. More specifically, the control unit 10 applies a voltage from a power supply 16 to the coil 52 of the electromagnet 5 when, for example, a value obtained from the rotation angle of the second link 3 with respect to the first link 2 exceeds a preset threshold (that is, the value becomes greater than a threshold or the value becomes less than a threshold) based on a detection signal of the encoder 12. On the other hand, the control unit 10 may stop application of a voltage to the coil 52 of the electromagnet 5 when, for example, it is detected that the affected leg of the user is in a swing leg state based on a detection result of a sensor that detects landing of the affected leg in a state where the motion assistance apparatus 1 is worn on the affected leg of the user as will be described later.

Figure 4:
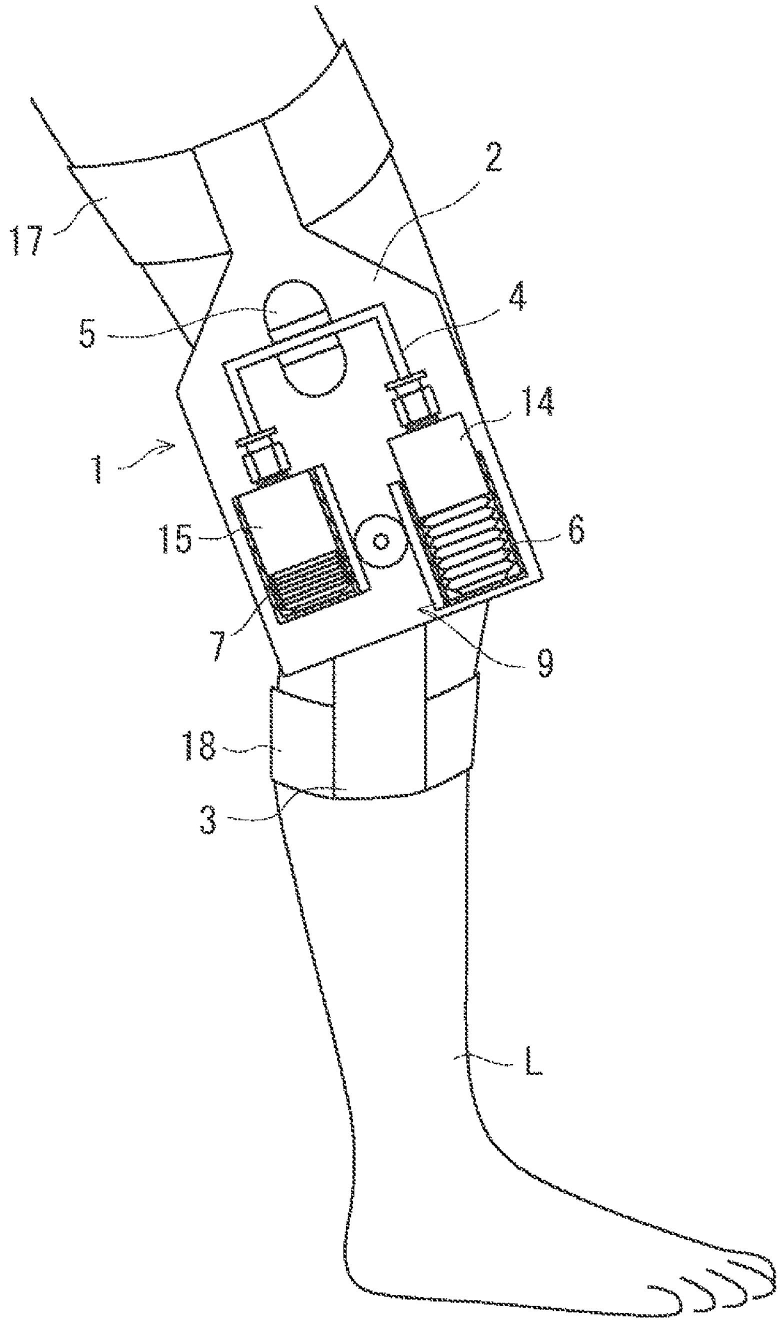
FIG. 4 is a view showing a state where the motion assistance apparatus according to the first embodiment is worn on an affected leg of a user.

Next, a state where the motion assistance apparatus 1 according to the present embodiment is worn on a user will be described. FIG. 4 is a view showing a state where the motion assistance apparatus according to the present embodiment is worn on the affected leg of the user. As shown in FIG. 4, when, for example, the user, such as a hemiplegic patient, does walking training, the motion assistance apparatus 1 is put over an affected leg L of the user, the first link 2 is fixed to the thigh of the affected leg L via a first fixing device 17, such as a belt, and the second link 3 is fixed to the lower thigh of the affected leg L via a second fixing device 18, such as a belt.

Thus, it is possible to put the motion assistance apparatus 1 on the affected leg L of the user. At this time, in a state where the first link 2 and the second link 3 are disposed in a straight line, the positive Z-axis side of the motion assistance apparatus 1 is the base side of the affected leg L, and the negative Z-axis side of the motion assistance apparatus 1 is the heel side of the affected leg L.

Next, the operation of the motion assistance apparatus 1 according to the present embodiment will be described. When the control unit 10 does not apply a voltage to the coil 52 of the electromagnet 5 via the power supply 16, flow of the magnetic fluid 8 is not restricted in the substantially hermetically sealed space defined by the duct 4, the first movable portion 6, and the second movable portion 7, and the user is able to bend the affected leg L without resistance, as shown in FIG. 1 and FIG. 4.

At this time, as the second link 3 rotates in the arrow A direction with respect to the first link 2, the pinion 93 rotates and, as a result, the second storage portion 92 moves toward the base of the affected leg L via the second rack 95 and the first storage portion 91 moves toward the heel of the affected leg L via the first rack 94. Thus, the second movable portion 7 contracts, the first movable portion 6 extends, and the magnetic fluid 8 moves from the second movable portion 7 to the first movable portion 6 via the duct 4.

Conversely, as the second link 3 rotates in the arrow B direction with respect to the first link 2, the pinion 93 rotates and, as a result, the second storage portion 92 moves toward the heel of the affected leg L via the second rack 95 and the first storage portion 91 moves toward the base of the affected leg L via the first rack 94. Thus, the first movable portion 6 contracts, the second movable portion 7 extends, and the magnetic fluid 8 moves from the first movable portion 6 to the second movable portion 7 via the duct 4.

On the other hand, when the control unit 10 applies a voltage to the coil 52 of the electromagnet 5 via the power supply 16, the viscosity of the magnetic fluid 8 at a part around the electromagnet 5 in the duct 4 increases, with the result that flow of the magnetic fluid 8 in the substantially hermetically sealed space defined by the duct 4, the first movable portion 6, and the second movable portion 7 is restricted. At this time, the motion assistance apparatus 1 generates a resistance against rotation of the second link 3 with respect to the first link 2, with the result that bending of the affected leg L is restricted.

In this way, the motion assistance apparatus 1 according to the present embodiment is configured to generate a resistance against rotation of the second link 3 with respect to the first link 2 by applying a magnetic field to the magnetic fluid 8. Therefore, the motion assistance apparatus 1 according to the present embodiment has a simple configuration as compared to a general motion assistance apparatus and is capable of achieving both simplification and size reduction.

Moreover, in the motion assistance apparatus 1 according to the present embodiment, the first movable portion 6 is accommodated in the substantially hermetically sealed space defined by the first lid portion 14 and the first storage portion 91, and the second movable portion 7 is accommodated in the substantially hermetically sealed space defined by the second lid portion 15 and the second storage portion 92. Therefore, even when the first movable portion 6 or the second movable portion 7 is damaged, it is possible to prevent leakage of the magnetic fluid 8 to outside the motion assistance apparatus 1.

In the motion assistance apparatus 1 according to the present embodiment, when the part of the duct 4, covered with the electromagnet 5, is at least partially made of a magnetically permeable material, the magnetic density of the magnetic fluid 8 at the time when a voltage is applied to the electromagnet 5 is increased as compared to when the duct 4 is not made of a magnetically permeable material. Therefore, in comparison with the case where the duct 4 is not made of a magnetically permeable material, the size of the electromagnet 5 is reduced.

Second Embodiment

Figure 5:
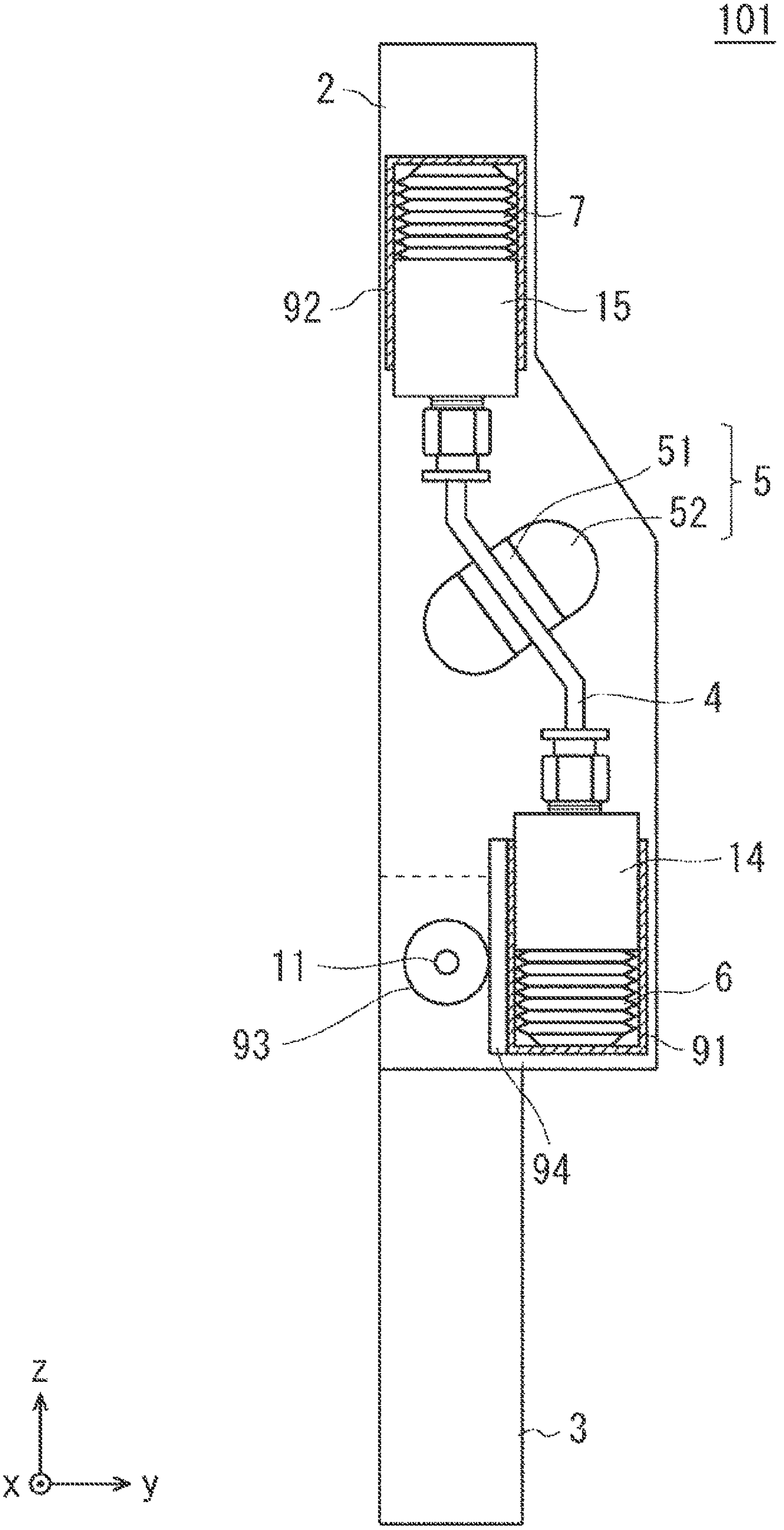
FIG. 5 is a view showing a motion assistance apparatus according to a second embodiment.

FIG. 5 is a view showing a motion assistance apparatus according to the present embodiment. The motion assistance apparatus 101 according to the present embodiment is configured substantially similarly to the motion assistance apparatus 1 according to the first embodiment except that, as shown in FIG. 5, rotation of the pinion 93 is configured to be transmitted to only the first storage portion 91.

Thus, as shown in FIG. 5, it is not necessary to dispose the first storage portion 91 and the second storage portion 92 such that the rotary shaft 11 is interposed in the Y-axis direction, so the width of the motion assistance apparatus 1 in the Y-axis direction is reduced.

In the present embodiment, as shown in FIG. 5, rotation of the pinion 93 is transmitted to only the first storage portion 91. Alternatively, rotation of the pinion 93 may be transmitted to only the second storage portion 92. In the present embodiment, the second movable portion 7, the second storage portion 92, and the like are provided on the first link 2. Alternatively, the second movable portion 7, the second storage portion 92, and the like may be provided on the second link 3.

Third Embodiment

Figure 6:
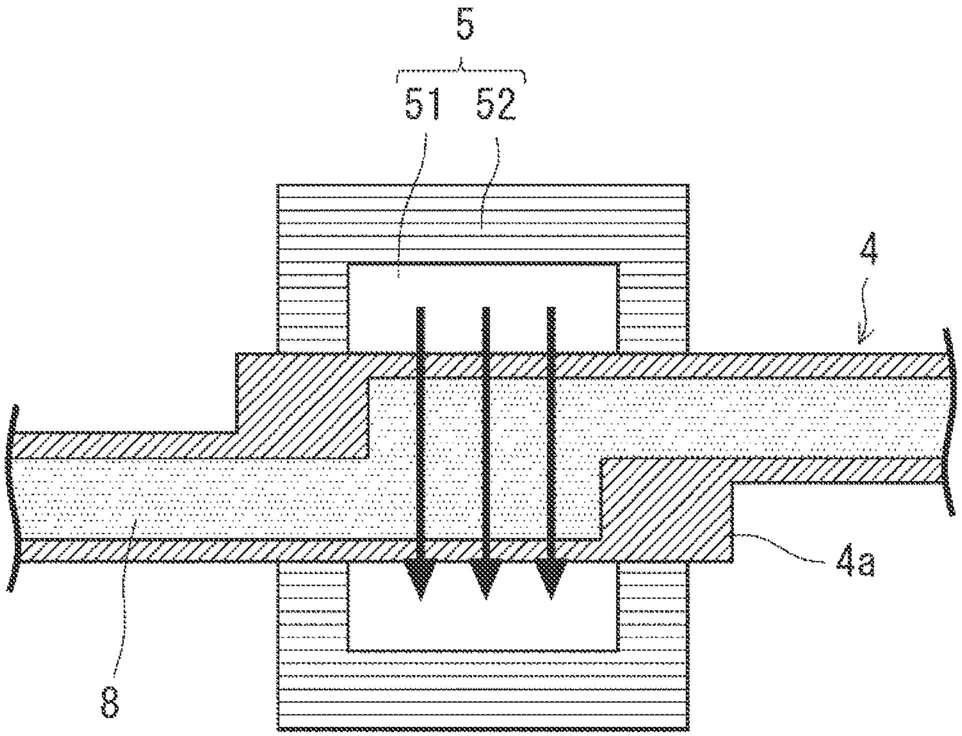
FIG. 6 is a view showing a part around an electromagnet in a motion assistance apparatus according to a third embodiment.

FIG. 6 is a view showing a part around the electromagnet in a motion assistance apparatus according to the present embodiment. The motion assistance apparatus according to the present embodiment is configured substantially similarly to the motion assistance apparatus 1 according to the first embodiment except that, as shown in FIG. 6, the duct 4 has a crank part **4*a* and the crank part 4*a* is at least partially covered with the electromagnet 5**.

In this way, when the duct 4 has the crank part 4*a*, magnetic flux is able to be applied substantially parallel to flow of the magnetic fluid 8 as shown in FIG. 6, so it is possible to generate a large resistance against rotation of the second link 3 with respect to the first link 2 as compared to when the duct 4 has no crank part 4*a*. The wide arrows in FIG. 6 represent magnetic flux generated by the electromagnet 5.

Fourth Embodiment

Figure 7:
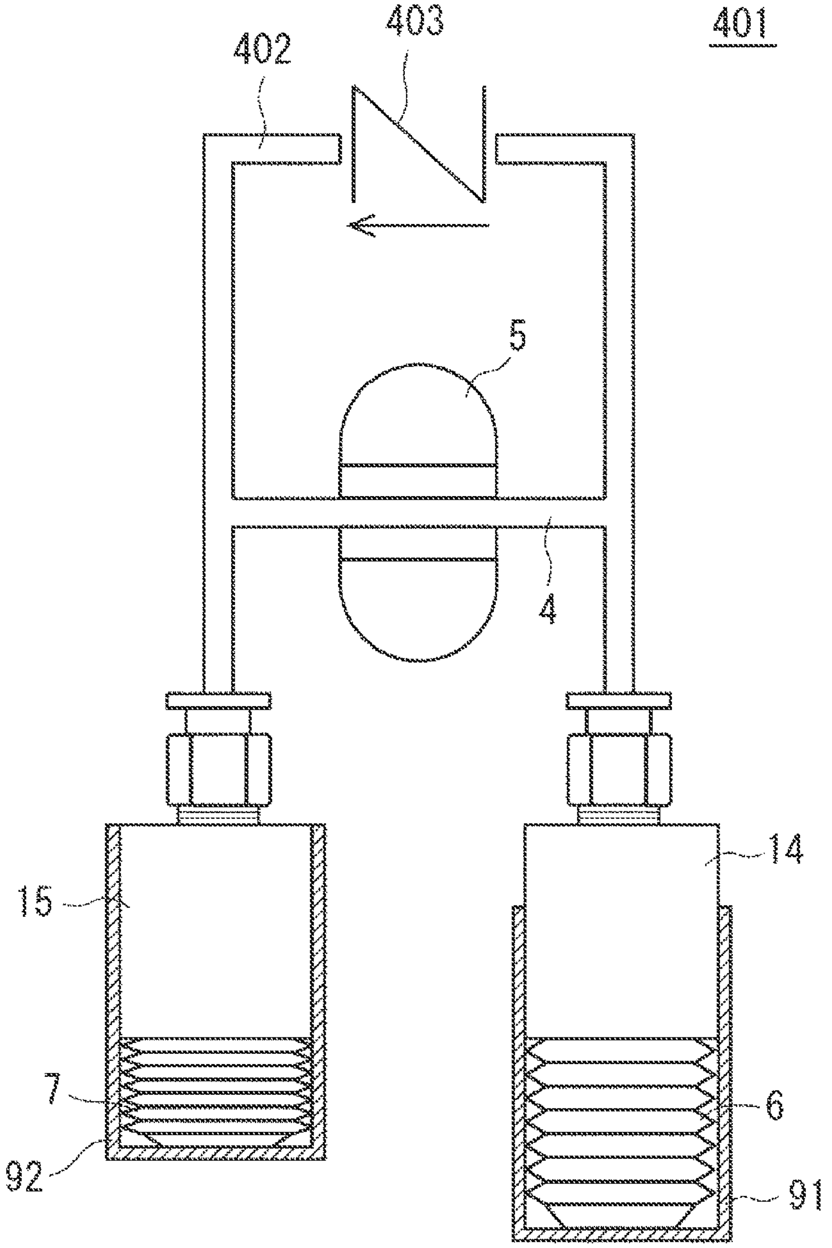
FIG. 7 is a view showing a motion assistance apparatus according to a fourth embodiment.

FIG. 7 is a view showing a motion assistance apparatus according to the present embodiment. FIG. 7 simplifies the motion assistance apparatus by omitting the first link 2, the second link 3, part of the transmitting portion 9, and the like. The motion assistance apparatus 401 according to the present embodiment is configured substantially similarly to the motion assistance apparatus 1 according to the first embodiment except that, as shown in FIG. 7, a bypass passage 402 is connected in parallel with the duct 4.

A check valve 403 is provided in the bypass passage 402. The check valve 403 is provided in the bypass passage 402 so as to, for example, permit flow of the magnetic fluid 8 from the first movable portion 6 to the second movable portion 7 and cut off flow of the magnetic fluid 8 from the second movable portion 7 to the first movable portion 6.

Thus, even when a voltage is applied to the electromagnet 5 and flow of the magnetic fluid 8 in the duct 4 is restricted, it is possible to flow the magnetic fluid 8 from the first movable portion 6 to the second movable portion 7 via the bypass passage 402. Therefore, it is possible to permit extension of the affected leg L while preventing knee buckling of the affected leg L.

However, depending on the details of motion assistance, the check valve 403 according to the present embodiment may be provided in the bypass passage 402 so as to cut off flow of the magnetic fluid 8 from the first movable portion 6 to the second movable portion 7 and permit flow of the magnetic fluid 8 from the second movable portion 7 to the first movable portion 6.

Fifth Embodiment

Figure 8:
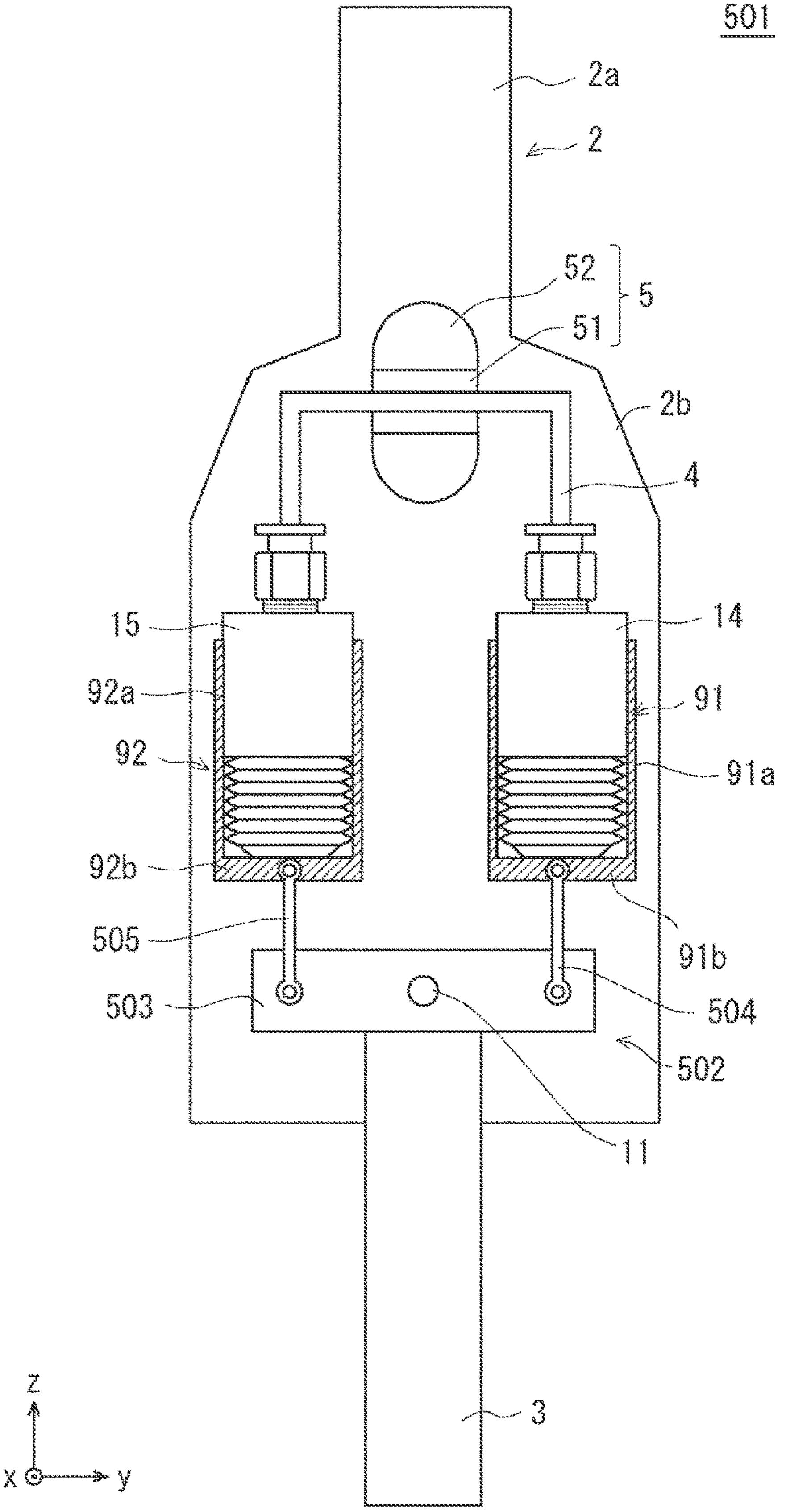
FIG. 8 is a view showing a motion assistance apparatus according to a fifth embodiment.

FIG. 8 is a view showing a motion assistance apparatus according to the present embodiment. The motion assistance apparatus 501 according to the present embodiment is configured substantially similarly to the motion assistance apparatus 1 according to the first embodiment except that, as shown in FIG. 8, the configuration of a transmitting portion 502 is different.

In the following description, for clear illustration, the configuration of the motion assistance apparatus 501 in a state where the first link 2 and the second link 3 are disposed in a straight line as shown in FIG. 8 will be described by using an orthogonal coordinate system (XYZ coordinate system).

In the motion assistance apparatus 501 according to the present embodiment, the second part 2*b* of the first link 2 is longer in the Z-axis direction than the second part 2*b* of the first link 2 according to the first embodiment and the second link 3 is disposed on the positive X-axis side with respect to the first link 2.

The rotary shaft 11 protrudes from the positive Z-axis-side end of the second link 3 toward the negative X-axis side and is inserted in the through portion formed at the negative Z-axis-side end of the first link 2. At this time, the rotary shaft 11 is disposed on the negative Z-axis side with respect to the first storage portion 91 and the second storage portion 92.

The transmitting portion 502 includes an arm 503, a first rod 504, and a second rod 505. The arm 503 has a plate shape substantially parallel to the YZ-plane and has a substantially rectangular shape with a long side in the Y-axis direction when viewed in the X-axis direction.

The arm 503 is fixed to the positive Z-axis-side end of the second link 3. At this time, the amount of projection by which the arm 503 projects from the rotary shaft 11 toward the positive Y-axis side is substantially equal to the amount of projection by which the arm 503 projects from the rotary shaft 11 toward the negative Y-axis side.

The first rod 504 has, for example, a rod shape and connects the positive Y-axis-side end of the arm 503 and the bottom 91*b* of the first storage portion 91. In other words, the positive Z-axis-side end of the first rod 504 is rotatably connected to the bottom 91*b* of the first storage portion 91, and the negative Z-axis-side end of the first rod 504 is rotatably connected to the positive Y-axis-side end of the arm 503.

The second rod 505 has, for example, a rod shape with a length substantially equal to that of the first rod 504 and connects the negative Y-axis-side end of the arm 503 and the bottom 92*b* of the second storage portion 92. In other words, the positive Z-axis-side end of the second rod 505 is rotatably connected to the bottom 92*b* of the second storage portion 92, and the negative Z-axis-side end of the second rod 505 is rotatably connected to the negative Y-axis-side end of the arm 503.

With the above link-structure transmitting portion 502, it is possible to convert rotation of the second link 3 with respect to the first link 2 to a relative position change in the Z-axis direction between the first movable portion 6 and the second movable portion 7 via the first storage portion 91 and the second storage portion 92.

In the present embodiment, the first storage portion 91 and the second storage portion 92 are disposed next to each other in the Y-axis direction. Even when the first storage portion 91 and the second storage portion 92 are disposed next to each other in the X-axis direction, similar operation is achieved. At this time, the rotary shaft 11 can be caused to function as in the case of a crankshaft of an engine, and the first rod 504 and the second rod 505 can be caused to function as a connecting rod of the engine.

The disclosure is not limited to the above-described embodiments and may be modified as needed without departing from the scope of the disclosure.

For example, the first movable portion may be made up of the first storage portion 91, and the second movable portion may be made up of the second storage portion 92. At this time, a substantially hermetically sealed space can be defined by the duct 4, the first storage portion 91, the first lid portion 14, the second storage portion 92, and the second lid portion 15, and the magnetic fluid 8 can be filled in the substantially hermetically sealed space.

For example, the transmitting portion can be configured to be capable of converting relative rotation between the first link 2 and the second link 3 to a relative position change between the first movable portion and the second movable portion in a state where the first link 2 and the second link 3 are coupled by the rotary shaft 11.

For example, in the above-described embodiments, the substantially hermetically sealed space is defined by the first lid portion 14 and the first storage portion 91, and the substantially hermetically sealed space is defined by the second lid portion 15 and the second storage portion 92; however, substantially hermetically sealed spaces do not always need to be defined. For example, the first lid portion 14 and the second lid portion 15 may be omitted.

For example, in the first embodiment and the like, the width of the duct 4 is substantially equal over the entire length. Alternatively, the inside diameter of part of the duct 4 may be reduced. At this time, a part at which the inside diameter of the duct 4 is reduced just needs to be a part covered with the electromagnet 5. Thus, it is possible to keep the high magnetic flux density of the magnetic fluid 8.

For example, in the above-described embodiments, the examples in which the motion assistance apparatus is worn on the affected leg L of a user are described. Alternatively, the motion assistance apparatus may be worn on the arm of a user.

For example, not only a voltage is applied to the coil 52 of the electromagnet 5 when the rotation angle of the second link 3 with respect to the first link 2 exceeds a preset threshold, but also a voltage may be applied to the coil 52 of the electromagnet 5 based on, for example, a detection result of a sensor that detects the inclination angle of the first link 2 with respect to a ground or grounding of the affected leg L. In other words, a voltage just needs to be applied to the coil 52 of the electromagnet 5 such that a predetermined motion of the joint of a user is restricted in a state where the motion assistance apparatus is worn on the user.

For example, when it is detected that the affected leg is in a swing leg state based on a detection result of a sensor that detects grounding of the affected leg of the user, not only application of a voltage to the coil 52 of the electromagnet 5 is stopped but also application of a voltage to the coil 52 of the electromagnet 5 can be stopped at desired timing of the user. For example, when a preset time has elapsed from when a voltage is applied to the coil 52 of the electromagnet 5, application of a voltage to the coil 52 of the electromagnet 5 may be stopped.

What is claimed is:

1. A motion assistance apparatus configured to be worn on a joint of a user, the motion assistance apparatus comprising:
- a first link;
- a second link coupled to the first link via a rotary shaft so as to rotate;
- a duct fixed to the first link;
- an electromagnet disposed so as to cover at least part of the duct;
- a first movable portion connected to a first end of the duct so as to communicate with the duct and configured to contain magnetic fluid;
- a second movable portion connected to a second end of the duct so as to communicate with the duct and configured to contain the magnetic fluid;
- the magnetic fluid filled in a hermetically sealed space defined by the duct, the first movable portion, and the second movable portion;
- a transmitting portion configured to convert relative rotation between the first link and the second link to a relative position change between the first movable portion and the second movable portion; and
- a control unit configured to control the electromagnet.

2. The motion assistance apparatus according to claim 1, wherein the at least part of the duct, covered with the electromagnet, is made of a magnetically permeable material.

3. The motion assistance apparatus according to claim 1, wherein:
- the duct includes a crank part; and
- the electromagnet is disposed so as to cover at least part of the crank part.

4. The motion assistance apparatus according to claim 1, further comprising:
- a bypass passage connected in parallel with the duct; and
- a check valve provided in the bypass passage.

5. The motion assistance apparatus according to claim 1, wherein:
- the transmitting portion includes
  - a closed-end cylindrical first storage portion connected to the first link so as to slide on the first link,
  - a closed-end cylindrical second storage portion connected to the first link so as to slide on the first link,
  - a pinion fixed to the rotary shaft, and
  - a first rack meshing with the pinion and fixed to the first storage portion;
- in a state where the first movable portion is accommodated in the first storage portion, a distal end of the first movable portion is connected to a bottom of the first storage portion; and
- in a state where the second movable portion is accommodated in the second storage portion, a distal end of the second movable portion is connected to a bottom of the second storage portion.

6. The motion assistance apparatus according to claim 5, further comprising a second rack meshing with the pinion and fixed to the second storage portion.

7. The motion assistance apparatus according to claim 5, further comprising:
- a first lid portion fitted to an opening of the first storage portion so as to be displaceable relative to the first storage portion and disposed between the first end of the duct and the first movable portion; and
- a second lid portion fitted to an opening of the second storage portion so as to be displaceable relative to the second storage portion and disposed between the second end of the duct and the second movable portion, wherein:
- the first lid portion includes a through portion configured to communicate the duct with the first movable portion; and
- the second lid portion includes a through portion configured to communicate the duct with the second movable portion.

8. The motion assistance apparatus according to claim 5, wherein:
- the first storage portion is connected to the first link via a slider so as to slide on the first link; and
- the second storage portion is connected to the first link via a slider so as to slide on the first link.

9. The motion assistance apparatus according to claim 1, wherein:
- the transmitting portion includes
  - a closed-end cylindrical first storage portion connected to the first link so as to slide on the first link,
  - a closed-end cylindrical second storage portion connected to the first link so as to slide on the first link,
  - an arm fixed to the second link,
  - a first rod connecting a first end of the arm and the first storage portion, and
  - a second rod connecting a second end of the arm and the second storage portion;
- in a state where the first movable portion is accommodated in the first storage portion, a distal end of the first movable portion is connected to a bottom of the first storage portion; and in a state where the second movable portion is accommodated in the second storage portion, a distal end of the second movable portion is connected to a bottom of the second storage portion.

10. The motion assistance apparatus according to claim 1, wherein:

the first movable portion is configured so as to extend and contract; and the second movable portion is configured so as to extend and contract.

11. The motion assistance apparatus according to claim 10, wherein:

the first movable portion includes a bellows; and the second movable portion includes a bellows.

12. The motion assistance apparatus according to claim 1, wherein:

the first movable portion is in a closed-end cylindrical shape; and the second movable portion is in a closed-end cylindrical shape.

13. The motion assistance apparatus according to claim 1, wherein the control unit is configured to control a voltage applied to the electromagnet.

14. The motion assistance apparatus according to claim 13, wherein the control unit is configured to control start and stop of application of the voltage to the electromagnet.

* * * * *